Figure 1:
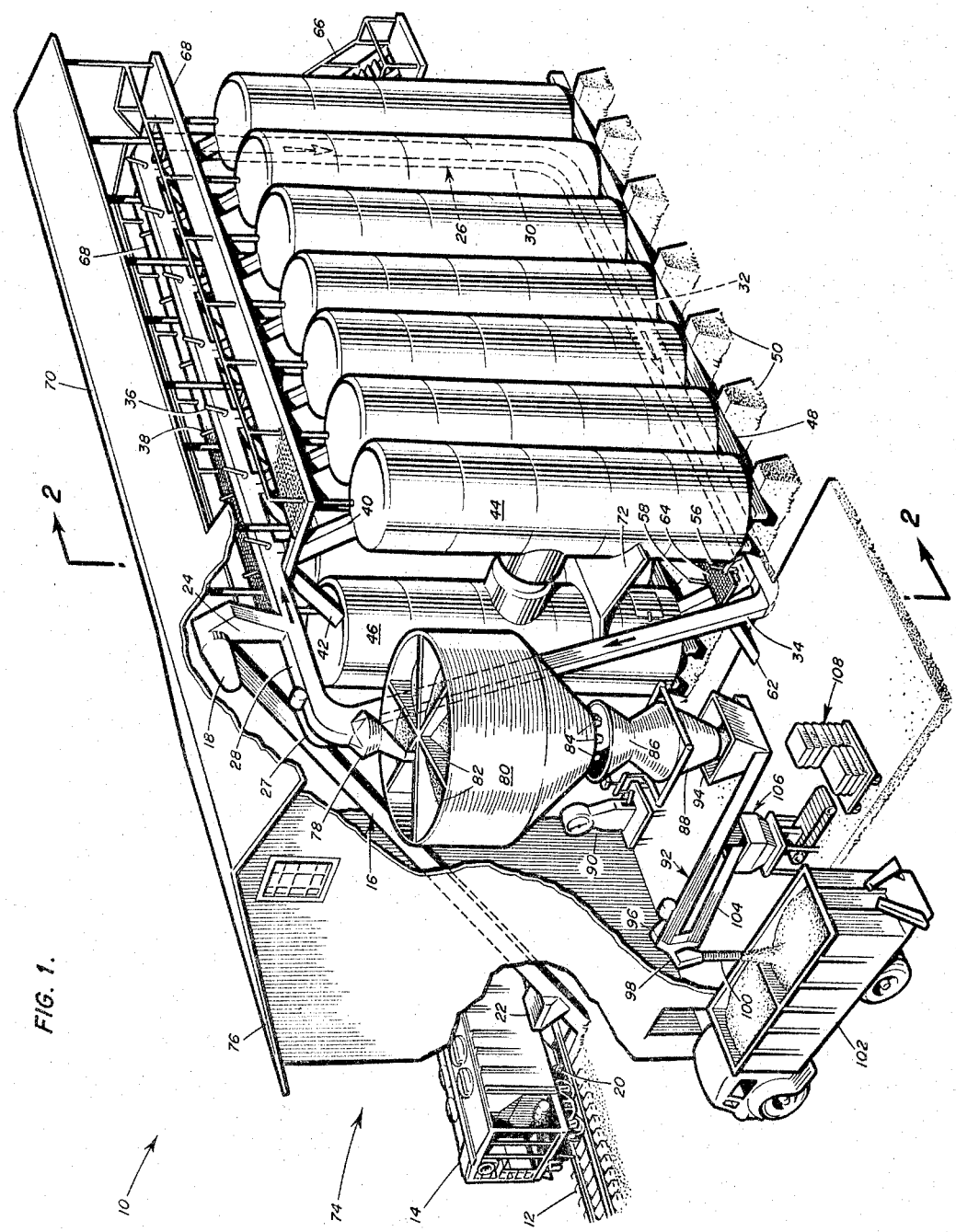

April 18, 1967 W. J. SACKETT, SR 3,314,557
TANK TYPE BULK BLENDING PLANT
Filed April 16, 1965 2 Sheets-Sheet 1

INVENTOR
WALTER J. SACKETT, SR.

BY Walter G. Finch
ATTORNEY

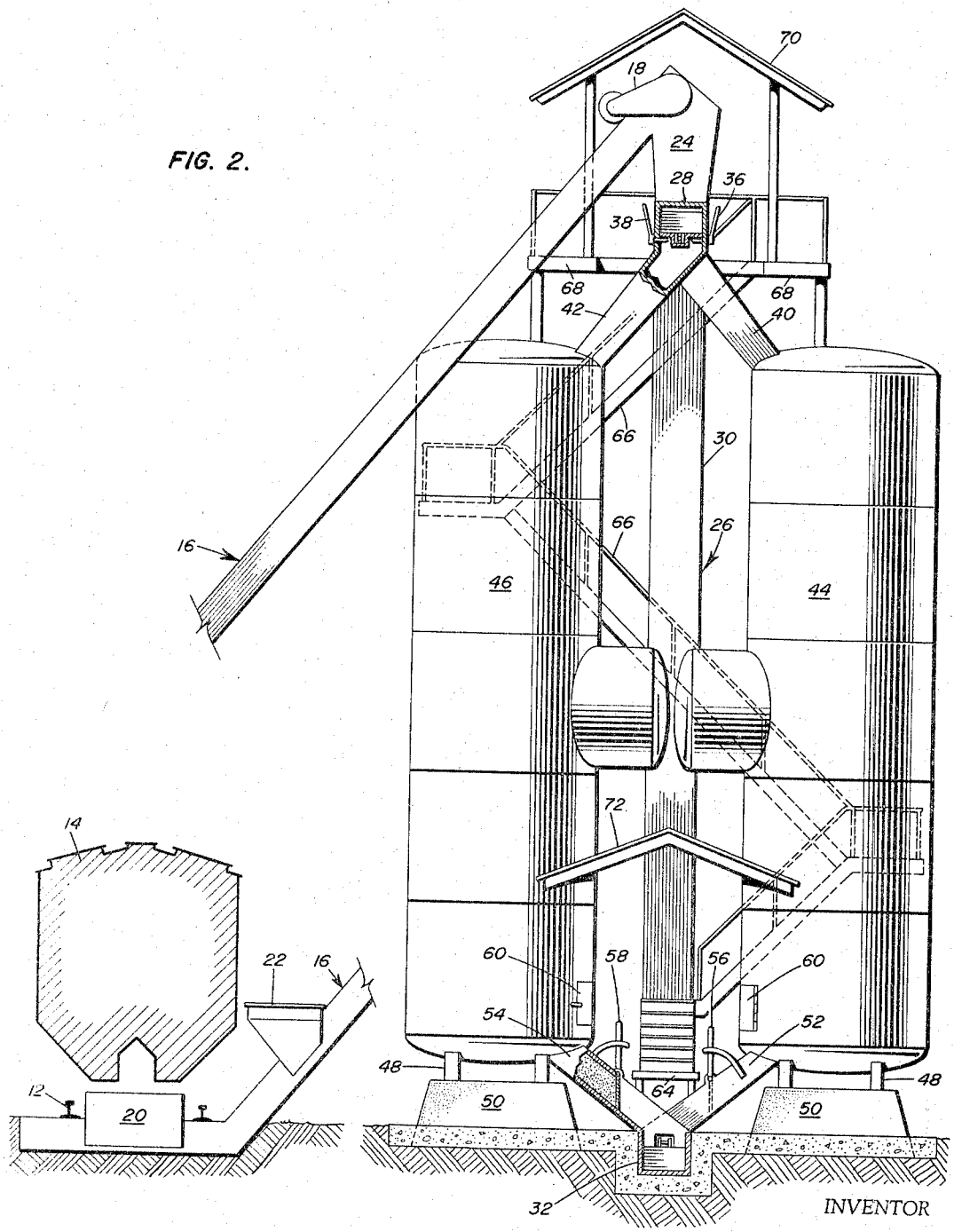

United States Patent Office 3,314,557
Patented Apr. 18, 1967

3,314,557
TANK TYPE BULK BLENDING PLANT
Walter J. Sackett, Sr., 3700 Echodale Ave.,
Baltimore, Md. 21206
Filed Apr. 16, 1965, Ser. No. 448,585
2 Claims. (Cl. 214—16)

This invention relates generally to material handling systems, and more particularly it pertains to a plant for the compounding of granular materials according to various formulas.

The plant of this invention is characterized by the ease with which the elements may be transported, erected, and assembled into a working facility. Further, the plant so constructed is compact, sturdy, practically all-metal, and relatively inexpensive.

It is an object of this invention to provide an arrangement of material storage containers with filling and dispersing means together with compounding and mixed product handling apparatus for efficient and rapid production of large and small quantities according to various mix specifications.

Another object of this invention is to provide a low cost multicellular storage elevator of the silo type which is fabricated from metallic railway tank cars.

Other objects of this invention are to provide a tank type bulk blending plant which is economical in construction costs, one which is efficient and reliable in operational use, and which is easy to install and maintain.

Other objects and attendant advantages of this invention will become more readily apparent and understood from the following detailed specification and accompanying drawings in which:

FIG. 1 is a perspective view of a novel bulk blending plant according to this invention shown broken away for clarity of detail; and FIG. 2 is a vertical section taken on line 2—2 of FIG. 1.

The plant to be described herein is built very inexpensively in that practically no masonry, other than footings, is required. The use of railway type tank car tanks for storage of raw materials means that the fullest advantage is taken of the prerequisite railroad to not only transport material but also to transport the plant itself to the site.

Raw material for processing can be unloaded directly from railroad hopper or box cars by a conveyor system where it is elevated to a second endless conveyor system which traverses the tops as well as the bottoms of the upended tanks to selectively charge or discharge them by gravity. Selected materials are elevated by the same endless conveyor to a blending machine and then dispensed as a mixed product either in bulk or bagged.

Referring now to the details of the drawings as shown in FIGS. 1 and 2, reference numeral 10 designated generally a bulk blending plant incorporating features of this invention.

Reference numeral 12 denotes the railroad line or siding serving the plant 10. A hopper car 14 is shown in position for unloading by a receiving conveyor system 16 having a motor drive 18. This conveyor system has a "between-the-tracks" receiving box 20 for gathering the raw material from the hopper car 14 as well as an elevated receiving box 22 for gathering it from box car shipments.

A gravity chute 24 extends downwardly from the top of the receiving conveyor 16 and discharges into a continuous or endless conveyor system designated generally by reference numeral 26. This endless conveyor system 26 driven by a drive arrangement 27 is in the form of a vertical loop having an upper horizontal section 28, a downfeed section 30, a lower horizontal section 32, which is open topped, and an up-feed or elevating section 34.

A row of storage tanks stands on each side adjacent to the conveyor system 26. These are taken from railway tank cars and upended to stand on cradle beams 48 of pedestals 50. The tanks are apertured at the ends and communicate with both the upper horizontal section 28 and lower horizontal section 32 of the conveyor 26 through chutes and gates.

As best shown in FIG. 2, the right hand tanks 44 have charging chutes 40 leading from gates 36, the left hand tanks 46 have charging chutes 42 and gates 38. The right hand tanks 44 discharge through gate 56 and chutes 52; the left hand tanks 46 correspondingly through gates 58 and chutes 54.

Cleanout and access doors 60 are provided on the lower sides of each tank and these as well as the discharge gates 56 and 58 are made accessible from a lower catwalk 64 and ramp 62. Stairs 66 lead to right and left upper catwalks 68 where access is thus provided to the charging gates 36 and 38. Shelter roofs 70 and 72 are provided over the upper and lower catwalks 68 and 64 respectively.

Material from the receiving conveyor discharge chute 24 is propelled by the upper horizontal section 28 of the endless conveyor 26 across the upper drop gates 36 and 38. If one of these is opened the material drops into the associated tank 44 or 46 for storage. Optionally, the material may be allowed to continue on the conveyor sections 28, 30, 32, and 34 for immediate processing.

Normally, however, the raw material is chosen and removed from the tanks by working the appropriate lower gates 56 or 58. It then flows along the lower horizontal conveyor section 32 and is elevated by section 34. Near the top of section 34 there is a bin selector 78 which discharges section 34 into a compartmented hopper 80 of the blending section 74 of the plant. This section 74 stands within a housing 76.

The ingredients of a batch are distributed as they arrive from the storage tanks 44 or 46 into valved bins or compartments 82 in the hopper 80. The valves 84 of the compartments 82 all open commonly into a discharge centering funnel 86. This causes the material to impinge upon the multiple distributing cones of a weigh-blending hopper 88.

Each ingredient of the material is weighed out on a weight scale system 90 associated with the hopper 88 and when the formula is complete it is manually or automatically dumped, blending as it falls, into a receiving hopper 94 of a final conveyor 92.

This conveyor system 92, driven by a drive arrangement 96, carries the formulated product to a split discharge gate 98 where it is directed either by a bulk delivery spout 100 to a spreader truck 102 or by a gravity chute 104 to a bagging machine 106 from which it emerges as a bagged product 108.

From the above, in summary, it is to be emphasized that the important economical advantages of the tank type bulk blending plant as described are made possible by the use of used surplus railway car tanks which are no longer serviceable for transporting liquids.

Obviously many modifications and variations of the present invention are possible in light of the above teachings. It is therefore, to be understood that within the scope of the appended claims the invention may be practiced otherwise than as specifically described.

What is claimed is:

1. A system for handling materials, comprising, a plurality of storage means, elevated blending means, a first conveyer section which is horizontally positioned, means for selectively feeding materials from said first conveyer section to said storage means and alternately passing said materials along the length of said first conveyer section, a second conveyer section forming a vertical continuation of said first conveyer section fo receiving and conveying materials passed along the length of said first conveyer section, a third conveyer section forming a horizontal continuation of said second conveyer section for receiving materials therefrom and for receiving materials from said storage means, and a fourth conveyer section which is inclined from the vertical and forming a continuation of said third conveyer section for receiving and elevating materials therefrom, said fourth conveyer section having an opening near its top in the direction of inclination from the vertical for delivering the received materials to said elevated blending means, with said fourth conveyer section terminating into said first conveyer section to form a closed vertical loop of said first, second, third, and fourth conveyer sections.

2. The system for handling materials as recited in claim 1, wherein said storage means consists of vertically positioned railway car tanks each having an upper material inlet and a lower material outlet.

References Cited by the Examiner
UNITED STATES PATENTS

| | | | |
|---|---|---|---|
| 259,387 | 6/1882 | Harrison | 214—16 |
| 3,068,076 | 12/1962 | Sackett | 214—2 |
| 3,207,330 | 9/1965 | Charyn et al. | 214—16 |

GERALD M. FORLENZA, *Primary Examiner.*

ROBERT G. SHERIDAN, *Examiner.*